United States Patent [19]

Gallant

[11] Patent Number: 5,725,934
[45] Date of Patent: Mar. 10, 1998

[54] MOUNTABLE DISC DISPLAY DEVICE

[75] Inventor: Glenn Gallant, Winchester, Mass.

[73] Assignee: Disc Concepts, Inc., Wellesley, Mass.

[21] Appl. No.: 614,054

[22] Filed: Mar. 12, 1996

[51] Int. Cl.[6] ........................................ B32B 3/00
[52] U.S. Cl. ................... 428/195; 428/64.1; 428/192; 428/411.1; 428/928; 369/282; 369/283
[58] Field of Search ................ 428/411.1, 913, 428/914, 115, 63, 64.1, 64.2, 192, 928; 369/283, 288, 282

[56] References Cited

U.S. PATENT DOCUMENTS

| | | | |
|---|---|---|---|
| 3,871,112 | 3/1975 | Licitis | 35/8 A |
| 4,784,408 | 11/1988 | Yasuda | 283/81 |
| 4,877,667 | 10/1989 | Hattori et al. | 428/64 |
| 4,879,710 | 11/1989 | Iijima | 369/291 |
| 4,903,255 | 2/1990 | Sugaya et al. | 369/284 |
| 4,926,410 | 5/1990 | Sazuki et al. | 369/290 |
| 4,996,681 | 2/1991 | Cocco et al. | 369/273 |
| 5,020,207 | 6/1991 | Minoda et al. | 29/527.4 |
| 5,085,911 | 2/1992 | Kato et al. | 428/65 |
| 5,301,183 | 4/1994 | Minoda et al. | 369/280 |
| 5,323,381 | 6/1994 | Takahashi et al. | 369/282 |

*Primary Examiner*—William Krynski
*Attorney, Agent, or Firm*—Paul J. Cook

[57] ABSTRACT

A display device is provided comprising one or more masking discs being printed on a surface and a transparent area for viewing printed matter on a substrate disc such as a compact disc. A masking disc or a protective layer includes a bushing extending through a central hole of the compact disc so that each masking disc and substrate disc are rotatably mounted relative to each other. The bushing cooperates with a securing disc to maintain the masking discs and substrate disc together. The securing disc includes means for mounting the display device on a substrate independent of the display device.

11 Claims, 6 Drawing Sheets

5,725,934

MOUNTABLE DISC DISPLAY DEVICE

BACKGROUND OF THE INVENTION

This invention relates to an information display device capable of providing information visually or digitally and visually. More particularly this invention relates to such a display device having means for storing the device.

Prior to the present invention, display devices have been provided which include a wheel rotatable within a stationary mask having one or more open windows. Information on this rotatable wheel is viewed through the window(s) to provide information to the viewer. In the case of multiple windows, information can be coordinated to relate to the same general subject to provide more in-depth information as compared to the use of a single window. The stationary mask also can be printed with further information such as a summary of the information which appears on the rotatable disc. The rotatable wheel is mounted on an eyelet or the like secured to the mask and extending through a central hole in the wheel to permit the desired wheel rotation within the mask. While the display devices have enjoyed wide use, the information they provide is quite limited by the size of the wheel, generally 4 to 8 inches in diameter, and the surface area. In addition, these devices are not provided with a means for storing them so that they can be misplaced easily.

Optical discs, and especially those commonly known as compact discs (CD'S), are widely used as a non-volatile storage medium for audio and video programs and other data. Such discs have an aluminum-coated pit track containing data that is encased by protective layers of polycarbonate plastic on both the label (non-read- side and data-read side. The plastic's optical characteristics enable the optical laser pickup to be focused on the pit track through the data-read side of the disc. However, if the plastic surface on the data-read side becomes scratched, permanent mistracking and skipping problems can occur due to the laser beam becoming misdirected. In addition, severe scratches on either side of the disc that penetrate to the pit track can destroy the data contained therein.

It would be desirable to provide an information display device which includes means for storing it thereby to provide ease of access to the user. In addition, it would be desirable to provide such an information display device which can provide access to visual information alone or together with encoded information such as digitally encoded information.

SUMMARY OF THE INVENTION

In accordance with this invention, one or more masking discs and a substrate disc are each printed with a pattern, each on one surface so that the printed patterns interact to provide the user with information. By the term "interact" as used herein is meant that the discs can be rotated relative to each other so that visual information on the discs can be selectively viewed through clear areas on the discs which function as windows. The discs are rotatably mounted relative to each other on an axis which extends through a central hole in the substrate disc mounting. Means for securing the display device on an independent substrate extends through a centrally located hole in the substrate disc. The securing mean can include a mechanical means such as a hook, a magnetic means, an adhesive surface, intertwining fibers or the like to secure the display device on the independent substrate.

In one embodiment, the present invention provides a display device which includes a compact disc (CD) having encoded information which can be accessed to produce visual and/or audio information as well as visual information which is not encoded. One or more masking discs are rotatably mounted on the compact disc. The discs are provided with visual information and the masking discs have at least one clear area which functions as a window to permit selective viewing of visual information on a surface of another disc. A layer of protective material can be positioned between the discs to protect the discs against scratching. Means are provided for securing the discs together and for mounting the secured discs on a separate support substrate. One disc can comprise a compact disc which includes digitally encoded information which can be converted to audio and/or visual information. An unprinted surface remote from the masking discs comprising the bottom surface of the substrate disc can be coated with a protective layer which permits use of the device as an insulated support such as a coaster. The encoded surface of the disc can be covered with a layer of hand removable polymeric material that is held by static electricity attraction which, in turn, can have a printed surface.

DESCRIPTION OF SPECIFIC EMBODIMENTS

Figure 1:
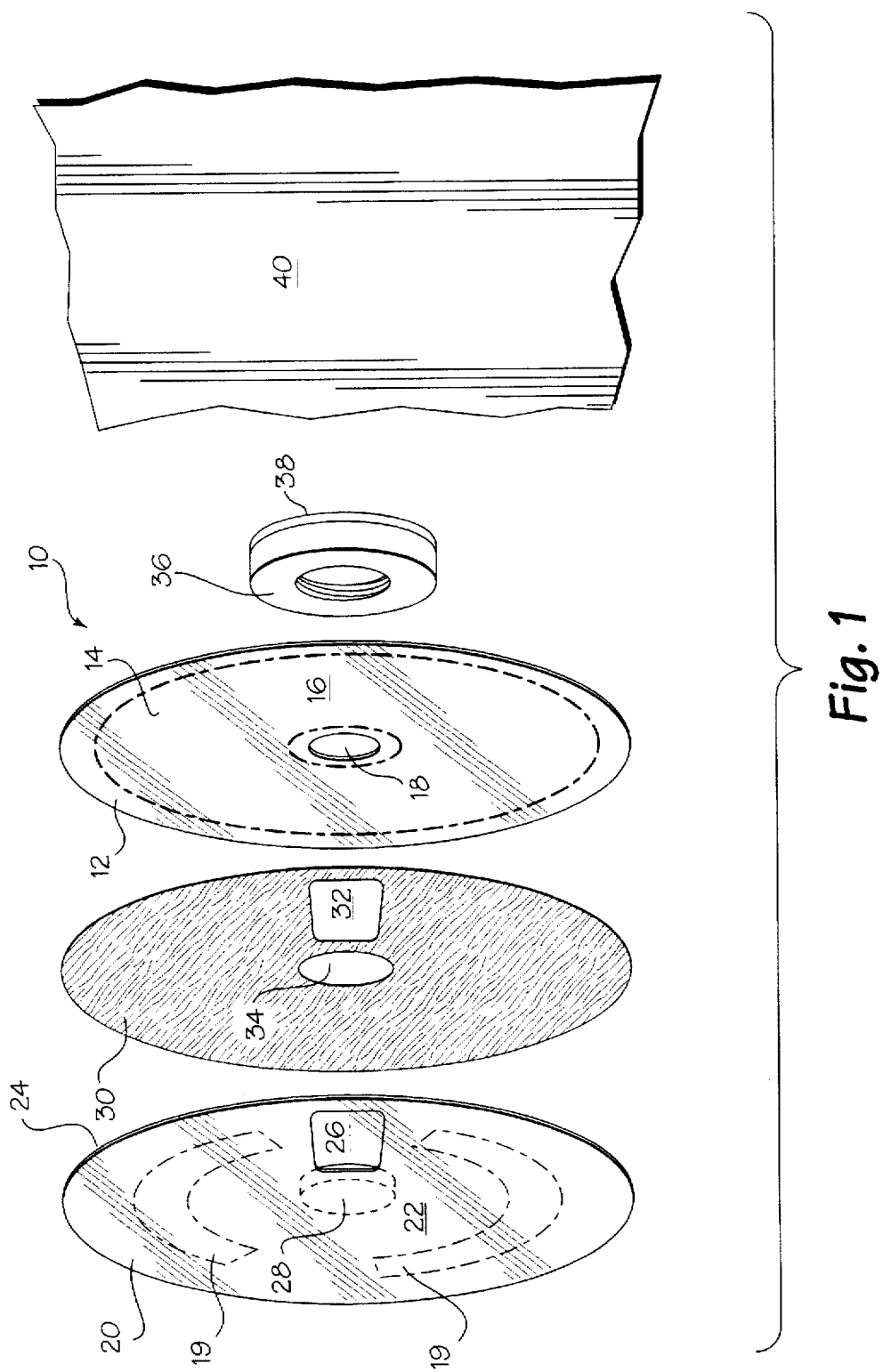
FIG. 1 is a perspective exploded view of one embodiment of this invention.

In accordance with this invention, a display device is provided which includes a substrate disc which can be a compact disc having information encoded thereon, e.g., digitally encoded on a compact disc-read only memory (CD-ROM) or a disc which does not include encoded information. The encoded information can be audio and/or visual. The encoded information can be accessed with any conventional audio disc player or personal computer. A surface of the substrate disc also is printed with visual unencoded information such as a calendar, information regarding a product line for sale, food or drink recipes or the like.

One or more masking discs are positioned on the substrate disc and are rotatable with respect to the compact disc. Each masking disc is printed with a pattern, for example which can include one or a plurality of windows or one or more patterns which interact with a pattern on the compact disc to provide visual information from a combination of the patterns. The masking discs and the substrate disc are mounted together by a fastening means secured directly to a masking disc or indirectly to a protective layer secured to the masking disc and which extends through a central hole in the substrate disc and any remaining masking discs.

A bushing, such as a threaded bushing is utilized as a mounting means for the discs. The bushing can be secured to the masking disc to which it is attached, directly or indirectly, by any conventional means such as a securing disc that can be snap-fit or threaded or the like onto the bushing. The securing disc then is rotatable with the bushing and the disc to which it is attached together as a unit relative to the substrate disc and wherein the axis of rotation comprising an axis which extends through the center of the hole in the substrate disc. Any remaining masking discs are rotatable on the bushing independently of the substrate disc and of the masking disc to which the bushing is attached, directly or indirectly.

The bottom surface of each masking disc adjacent the substrate disc can be coated with a protective layer which minimizes or prevents scratching of the printed surfaces when the discs are rotated relative to each other. A suitable protective layer can comprise a fibrous polymeric layer such as a TYVEK® sheet available from DuPont Corporation or the like.

The masking discs can be printed either on a top surface remote from the substrate disc or on a bottom surface adjacent the substrate disc. The masking discs are formed from a transparent or translucent polymeric material so that the pattern printed thereon can be viewed to interact with the pattern printed on the substrate disc. Representative suitable polymeric materials include polyacrylic acid, polyacrylates, polymethacrylates, polycarbonates or the like.

The securing disc is provided with means for securing the display device to a support. This means can comprise a mechanical securing means such as a hook, interlocking fibers on two surfaces such as a VELCRO® fastener or the like or a magnetic material or an adhesive surface or the like. The magnetic material comprises a preferred embodiment of this invention and can be utilized to secure the display device to a support formed of a ferromagnetic material such as is found on a refrigerator having a ferromagnetic housing or door or ferromagnetic file cabinet. Suitable magnets are formed from metal or polymeric magnetic compositions.

This invention will be described hereinafter with reference to a compact disc having digitally encoded audio and/or visual information as the substrate disc. However, it is to be understood that the substrate disc need not be a compact disc but can comprise a disc which has one surface printed with a pattern but without digitally encoded information.

Referring to FIG. 1, the display device 10 includes a compact disc 12 having information 14 printed on a top surface 16 and which has a central hole 18. The second or masking disc 20 includes a printed top surface 22 and/or a printed bottom surface 24 having a pattern 19 which includes a window 26 comprising an unprinted transparent area. The transparent area 26 permits viewing of the printed area 14 on the compact disc. A bushing 28, such as a threaded bushing is secured to the bottom surface 24 of the disc 20. In an alternative preferred embodiment, the bushing 28 is secured to protective layer 30 and the hole 34 is eliminated.

A protective layer 30 is secured to the bottom surface 24 of the masking disc 20. The protective layer 30 is made of a low friction, non-scratching material such as a non-woven fibrous layer, e.g., TYVEK® non-woven fiber sheet. The protective layer 30 includes a window 32 positioned adjacent window 26 to permit viewing of the printed matter 14.

The compact disc 12 and masking disc 20 have the protective layer 30 secured thereto and are secured together by extending bushing 28 through holes 34 and 18 and screwing threaded securing disc 36 thereon. The bottom surface 38 of securing disc 36 is provided with an attachment means such as magnetic material, an adhesive or a mechanical means such as a hook or suction cup, or the like, preferably a magnetic material to secure the display device 10 to a substrate 40.

Figure 2:
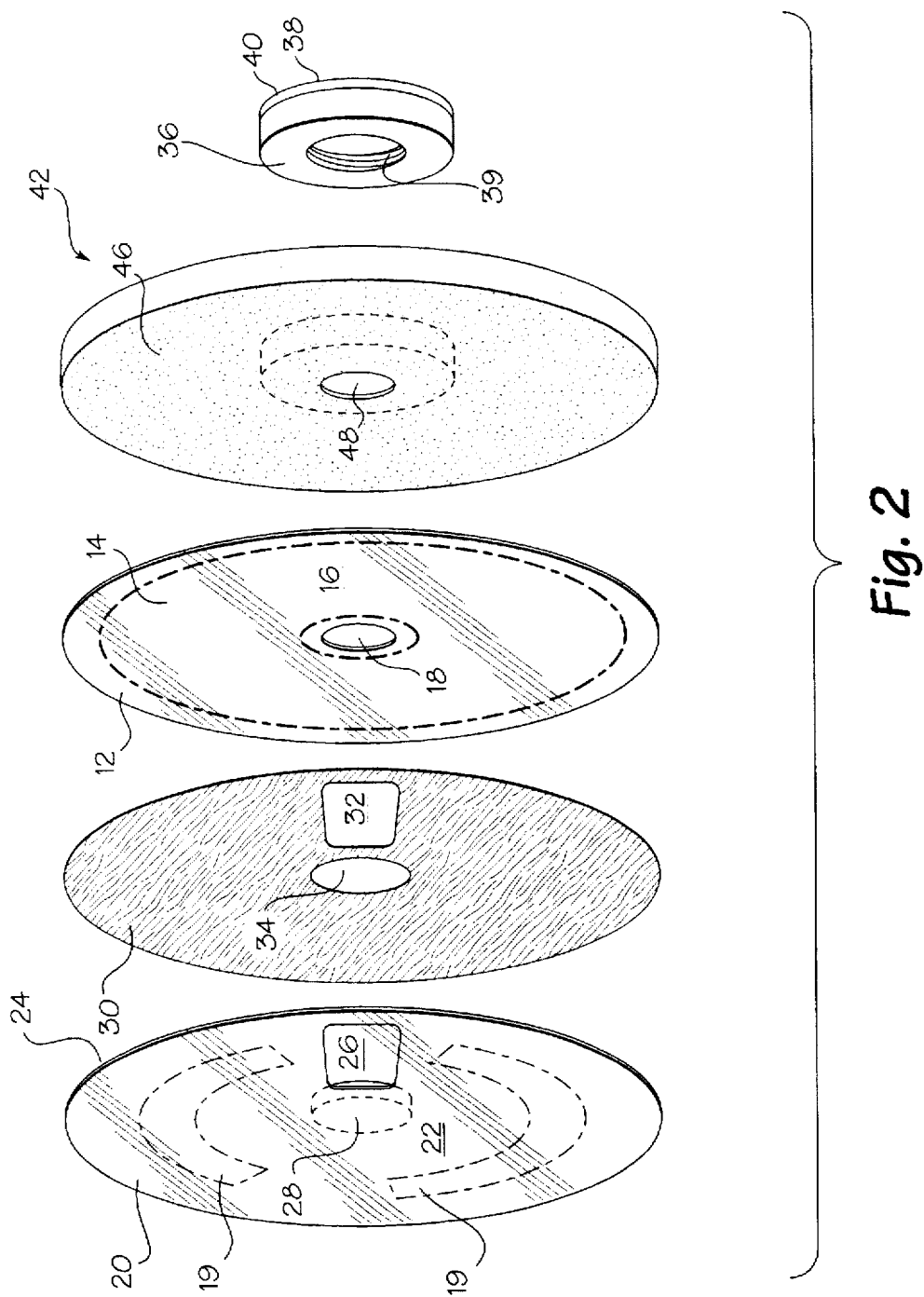
FIG. 2 is a perspective exploded view of a second embodiment of this invention.
Figure 5:
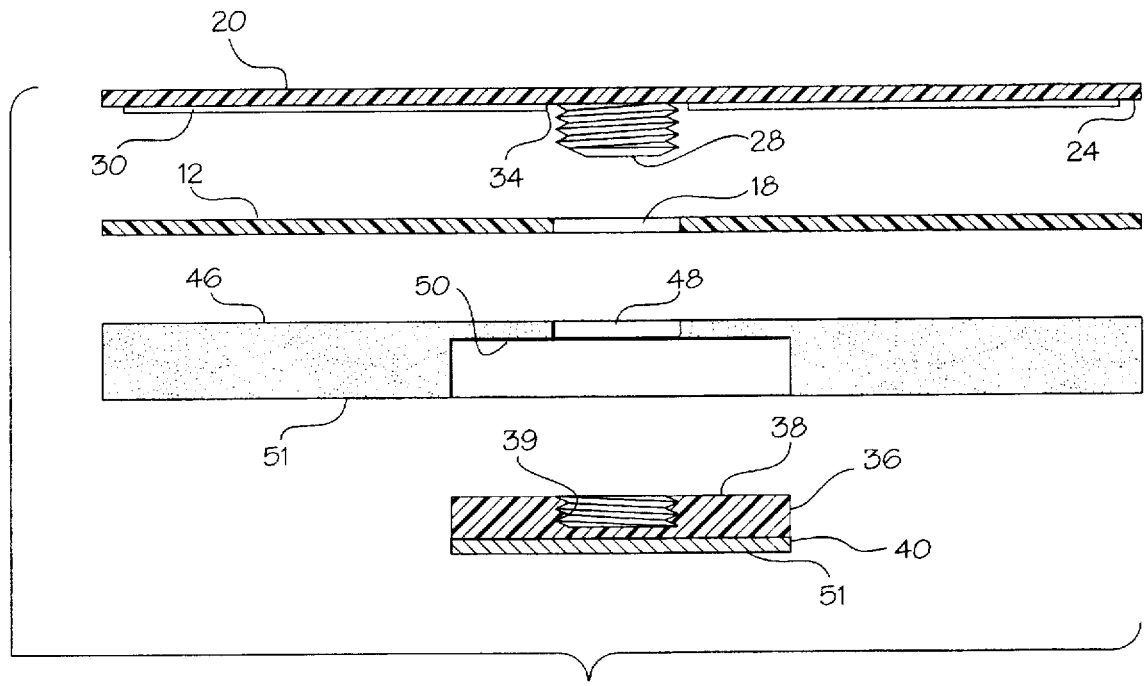
FIG. 5 is an exploded view of an alternative embodiment of this invention.

Referring to FIGS. 2 and 5, the display device 42 includes a masking disc 20 which has a printed top surface 22 and/or printed bottom surface 24 having a pattern 19 which includes window 26. Masking disc 20 includes a threaded bushing 28 secured to bottom surface 24.

Compact disc 12 having digitally encoded information also is printed with patterns 14 on top surface 16 and has a centrally positioned hole 18. Protective layer 30 having central hole 34 and window hole 32 is secured to the bottom surface 24 of masking disc 20.

A protective thermally insulating layer 46 having hole 48 is positioned adjacent compact disk 12.

Securing disc 36 having a magnetic material layer 40 and a threadable section 39 is mounted on bushing 28 which, in turn, extends through holes 34, 18 and 48. The disc 36 has a flat bottom surface 38 (see FIG. 5), is threadably mounted on threaded bushing 28 and extends into recess 50 of insulating layer 46 so that surface 38 of securing disc 36 and bottom surface 51 forms an essentially flat surface so that the display device 42 also can function as a thermally insulating layer (coaster). The magnetic material 38 of securing disc 36 permits the display device to be mounted on a metal surface of a refrigerator or the like for easy storage. The coaster can be used when obtaining a cold beverage of choice from the refrigerator. Alternatively, a securing disc 36 can be made entirely of a magnetic material.

Figure 3:
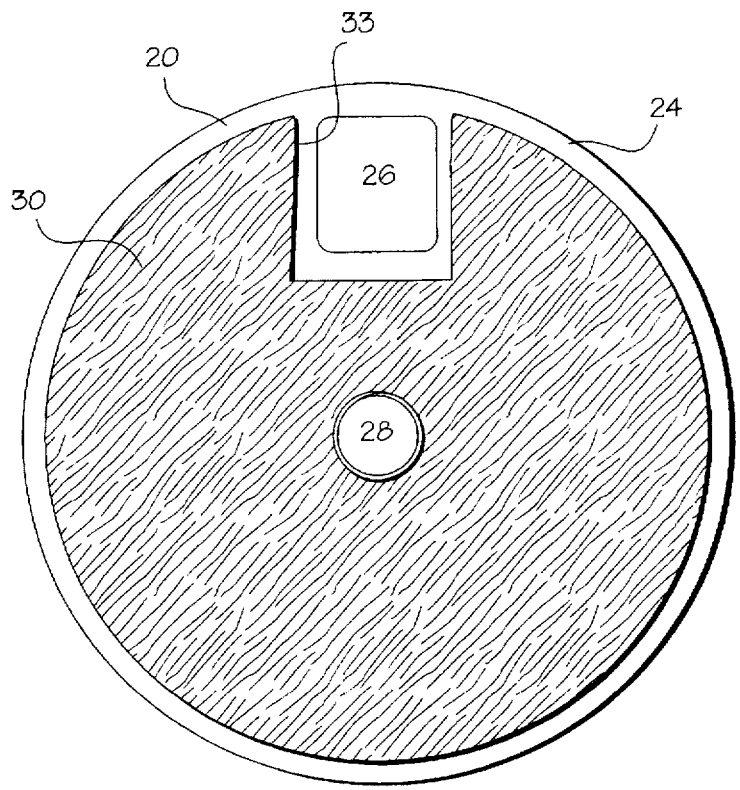
FIG. 3 is a bottom view of the masking disc utilized in the present invention.

As shown in FIG. 3, the bottom surface 24 of masking disc 20 includes protective layer 30 such as formed from a TYVEK® non-woven fibrous layer 30 having a window 33 secured to thereto. Bushing 28 can be secured directly to the layer 30.

Figure 4:
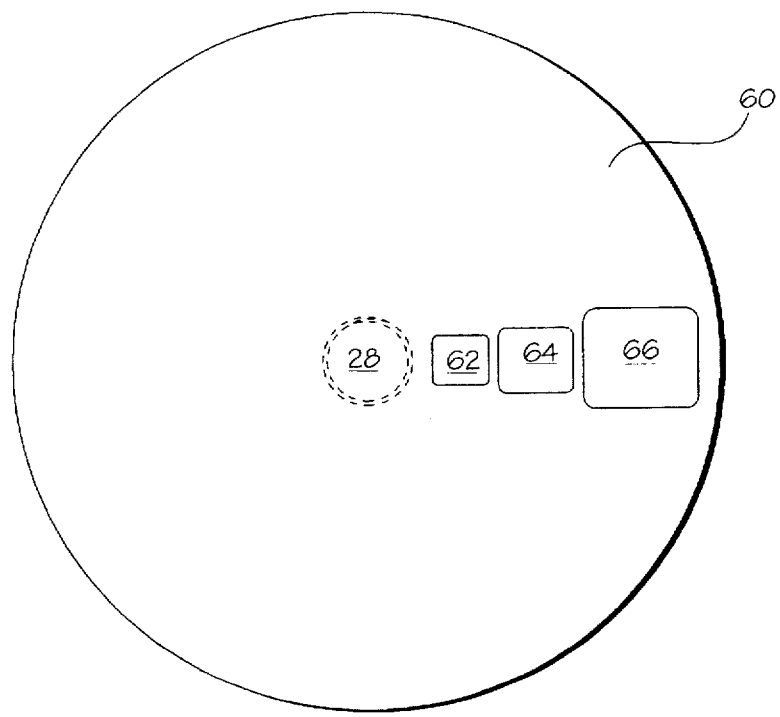
FIG. 4 is a top view of an alternative embodiment of this invention utilizing a plurality of windows.

As shown in FIG. 4, masking disc 60 has a plurality of transparent windows 62, 64 and 66. A protective layer, when used in conjunction with masking disc 60 also includes an open area or areas to permit viewing of printed matter on a top surface of a compact disc.

Figure 6:
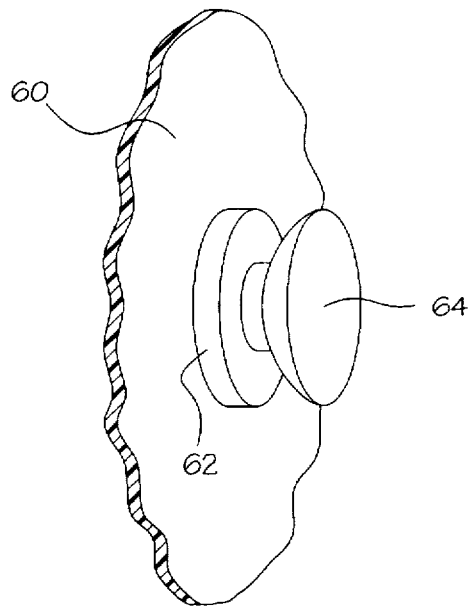
FIG. 6 is a bottom view of an alternative embodiment of this invention.

Referring to FIG. 6, an alternative means for mounting a display device which is mounted also on a bushing is shown. The bushing (not shown) secured to a masking disc (not shown) extends through a central hole of a compact disc 60 and is secured to a securing disc 62 which includes a suction cup 64 for attaching a display device of this invention to a substrate.

Figure 7:
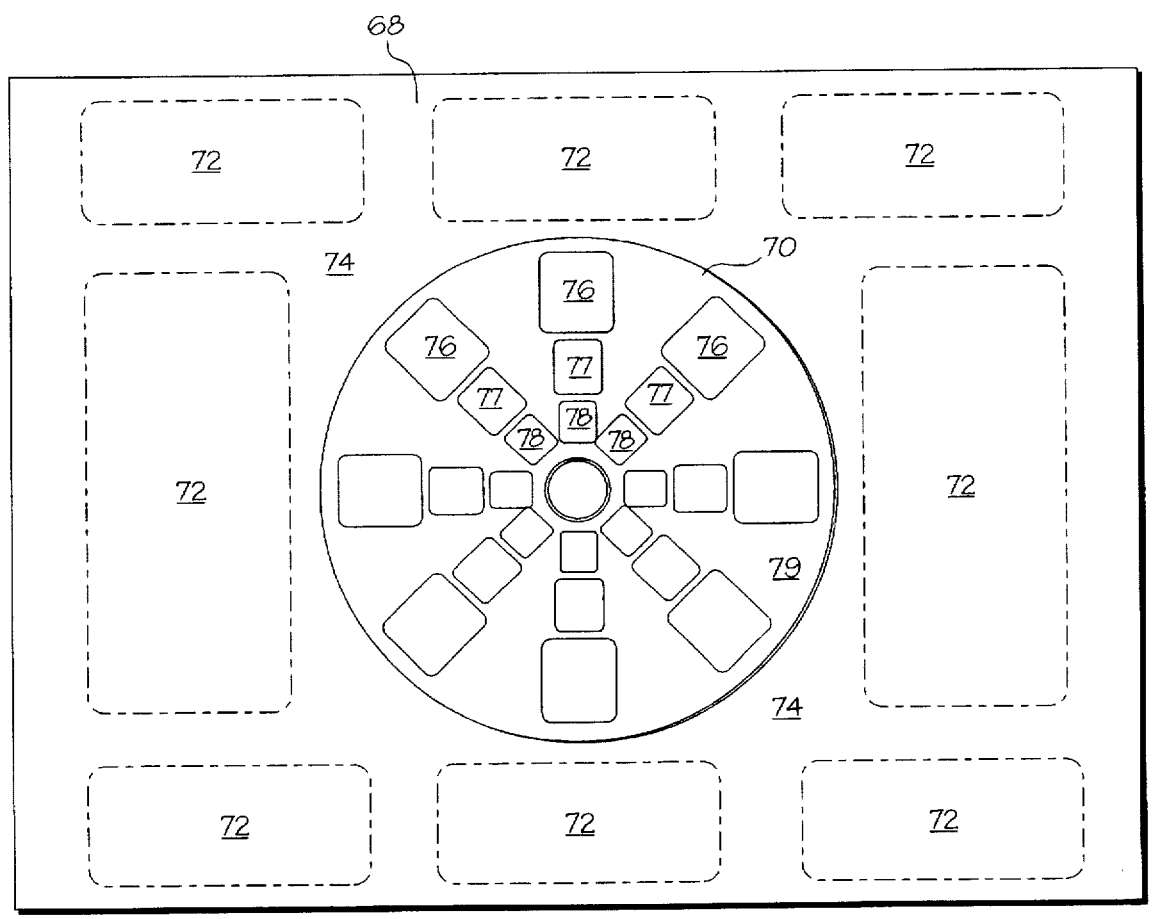
FIG. 7 is an exploded view of an alternative embodiment of this invention having a plurality of masking discs.

Referring to FIG. 7, the masking disc 68 is generally larger than compact disc 70. Masking disc 68 includes outer printed areas 72 and transparent area 74. Outer printed areas 76, middle printed areas 77 and inner printed areas 78 are provided on compact disc 70. A row of transparent windows is provided on masking disc 68 to view a single row of areas 76, 77 and 78. The transparent windows are surrounded by an opaque area 79. The masking disc and compact disc need not be the same areas or surface configuration so that the term "disc" as utilized therein is not limited to a disc having circular surface area but can include any area configuration.

Figure 8:
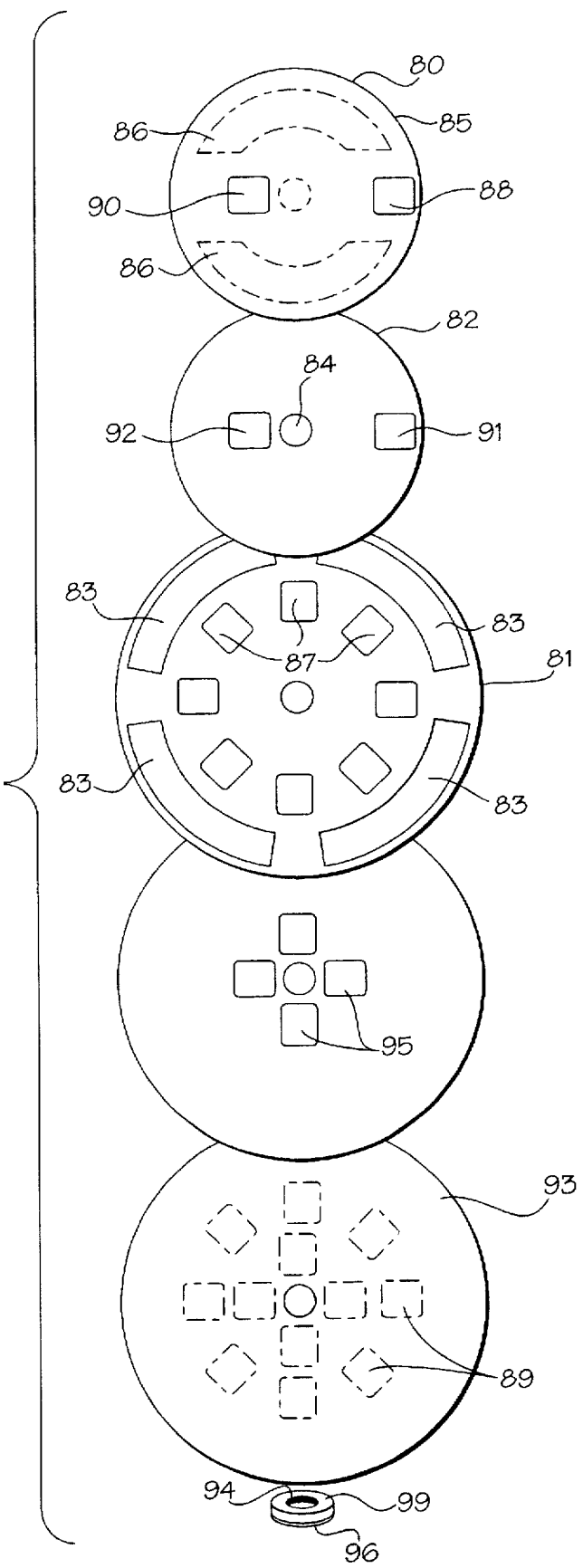
FIG. 8 is a top view of an alternative embodiment of this invention.

Referring to FIG. 8, a display device is shown having a plurality of masking discs. Masking disc 80 is adhered to protective layer 82 which, in turn, has a threaded bushing 84 adhered thereto. The disc 80 includes printed information 86, a radially outwardly positioned transparent window 88 and a radially inwardly positioned transparent window 90. Protective layer 82 includes window 91 which registers with window 88. Window 92 registers with window 90. Masking disc 81 has a larger diameter than the masking disc 80 and includes printed information 83 positioned radially outward of perimeter 85 of disc 80 so that the information 83 can be viewed when disc 80 is positioned on disc 81. Disc 81 includes a plurality of radially outwardly positioned windows 87 which are registerable with window 91 so that information 89 on substrate or compact disc 93 can be viewed through windows 87 and 88. Windows 95 are positioned on protective disc 97. Securing disc 99, having inner thread 94 is screwed onto threaded bushing 84 to secure the discs 80, 81 and 93 together. Securing disc 99 has a magnetic layer 96 to secure the display device to a ferromagnetic substrate. Additional masking discs with appropriately positioned windows and having appropriate diameters to view information on all the discs also can be provided. The masking discs having a hole therethrough and which are not coated with a protective layer also can function as a compact disc having encoded audio and/or video information only in disc areas that need not be transparent to permit viewing of information on another disc.

I claim:

1. A disc display device which comprises:

a first disc formed of a plastic material having a first flat printed surface and a first hole on said first disc, at least one masking disc formed of a plastic material having a second printed surface, a flat bottom surface and at least one first transparent area for viewing at least a portion of said first printed surface, said first printed surface of said first disc positioned to be viewed through said at least one transparent area, one of said at least one masking disc having a bushing secured thereto and positioned to extend through said first hole, a securing means secured to said bushing to permit said first disc and said at least one masking disc to rotate relative to each other and, a magnet means on said securing means to attach said display device to a substrate independent of said display device.

2. The display device of claim 1 wherein said bushing is secured to a protective layer and said protective layer is secured to one of said at least one masking disc and wherein said protective layer has at least one second open or transparent area to permit viewing of at least a portion of printed matter on said first disc and/or on a second masking disc when said at least one first transparent area is aligned with said at least one second open or transparent area.

3. The display device of claim 2 which includes a thermally insulating layer positioned between said first disc and said securing means, said thermally insulating layer having a hole into which said bushing extends to be secured to said securing means.

4. The display of claim 1 wherein said first disc includes encoded audio and/or visual information.

5. The display device of claim 4 which includes a thermally insulating layer positioned between said first disc and said securing means, said thermally insulating layer having a hole into which said bushing extends to be secured to said securing means.

6. The display device of claim 2 wherein said first disc includes encoded audio and/or visual information.

7. The display device of claim 6 which includes a thermally insulating layer positioned between said first disc and said securing means, said thermally insulating layer having a hole into which said bushing extends to be secured to said securing means.

8. The display device of claim 1 which includes a thermally insulating layer positioned between said first disc and said securing means, said thermally insulating layer having a hole into which said bushing extends to be secured to said securing means.

9. The display device of any one of claims 1, 2, 4, or 6, wherein said first disc has a larger surface area then said second masking disc.

10. The display device of any one of claims 1, 2, 4, or 6, which includes a second masking disc having a flat bottom surface and wherein said first disc has a larger surface area than said second masking disc.

11. The display device of any one of claims 1, 2, 4, or 6, wherein said display device includes a plurality of masking discs each having a flat bottom surface.

* * * * *